J. C. COLE.
SECTIONAL SOLID TIRE.
APPLICATION FILED SEPT. 27, 1910.
1,068,040.
Patented July 22, 1913.
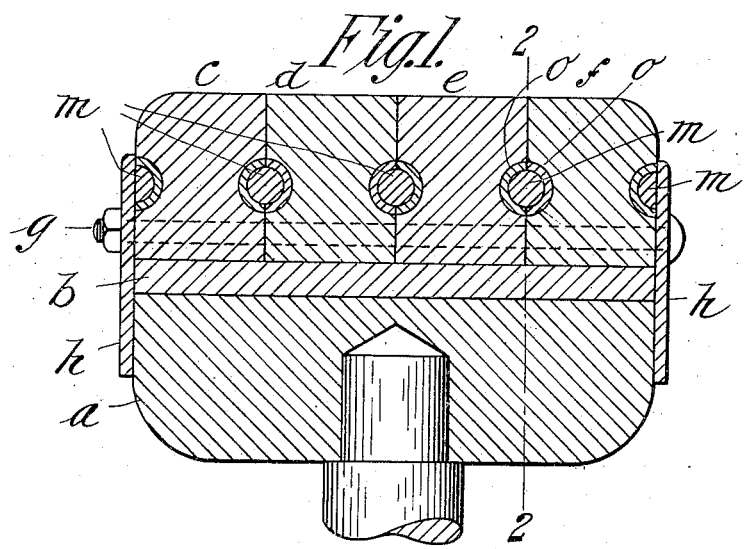
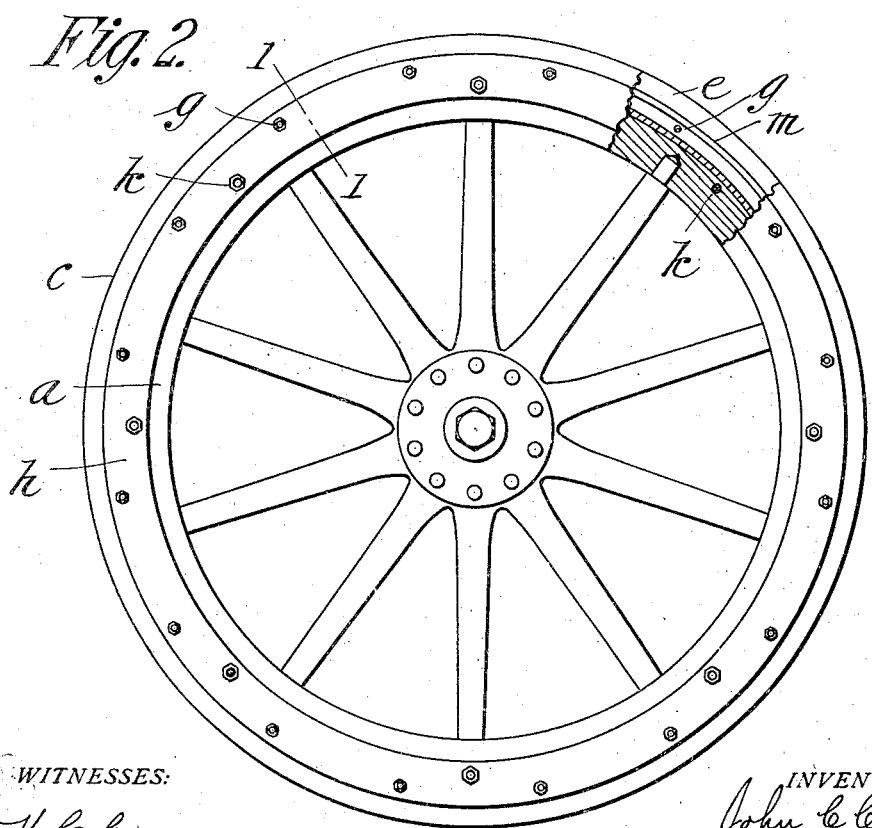
WITNESSES:
INVENTOR.
John C. Cole.
BY
Chapin Teg.
ATTORNEY.

UNITED STATES PATENT OFFICE.

JOHN CLARENCE COLE, OF CHICOPEE FALLS, MASSACHUSETTS, ASSIGNOR TO FISK RUBBER COMPANY, OF CHICOPEE FALLS, MASSACHUSETTS, A CORPORATION OF DELAWARE.

SECTIONAL SOLID TIRE.

1,068,040.  Specification of Letters Patent.  Patented July 22, 1913.

Application filed September 27, 1910. Serial No. 583,988.

*To all whom it may concern:*

Be it known that I, JOHN CLARENCE COLE, a citizen of the United States of America, residing at Chicopee Falls, in the county of Hampden and State of Massachusetts, have invented new and useful Improvements in Sectional Solid Tires, of which the following is a specification.

This invention relates to vehicle wheel tires of the resilient type commonly known as "solid tires" in contradistinction to the pneumatic type. These tires are in general use on vehicles designed to carry heavy loads and are built up of layers of fabric and rubber, usually, the outer wearing surface or tread being covered with a suitable thickness of rubber. Tires of this character have to be made relatively very wide and thick and it has been found difficult in the manufacture thereof, when made in one piece, to secure complete vulcanization of the tire through to the center thereof and manufacturers have, therefore, resorted to the plan of building up the tires in the shape of several rings which are afterward fitted side by side over the rim of the wheel and securely bolted thereto by means of side flanges embracing portions of the two outer rings and the felly. Difficulty, however, has been experienced in holding these rings firmly to the rim of the wheel, there being a tendency, by the clamping action of the flanges, to force the annular members constituting the tire, away from the rim, particularly such of said members as are located near the center of the rim. To restrain this action, by means of the bolts passing through the flanges and the tire, has been found impracticable as in a very short time the bolts will cut into the fabric when the tire is in use.

In the construction forming the subject of the present application many of the objections above referred to are overcome and the invention is fully illustrated in the accompanying drawing, in which,—

Figure 1 is a cross sectional view of a tire embodying the improvements on a large scale, the plane of the section being indicated by line 1—1, Fig. 2. Fig. 2 is a side elevation on a smaller scale of a complete wheel, a part thereof being broken away in the plane of the line 2—2, Fig. 1, to more clearly show the construction thereof.

Referring to these drawings, *a* is the felly of the wheel to which, preferably, is applied the usual metal rim *b* on which the resilient tire is seated. This tire is made up of a number of annular sections, indicated in the drawing by *c*, *d*, *e* and *f*, which are made up of layers of fabric and rubber in the usual manner, and after being properly vulcanized, are assembled together side by side on the rim *b*, the combined width of the tire sections when so placed being somewhat greater than the width of the rim *b*. These tire sections have holes molded therein, transversely, for the reception of bolts *g*, which also extend through the annular flanges *h* which are wide enough to overlap a sufficient area of the tire on both sides thereof and also the felly, other bolts *k* extending through the flanges and the felly to firmly secure the tire and flanges to the wheel.

To overcome the tendency of the annular tire sections to spring away from the rim under lateral compression, means are provided for interlocking the sections one to another, and preferably to the flanges *h* also in such manner as to prevent the radial distortion of said tire sections. Said means consist of endless metal rings *m* located in the plane of the divisional line between the tire sections *c*, *d*, *e*, and *f* so positioned in the tire that the bolts *g* may be passed thereunder. Those of said rings which are entirely embedded in the tire structure are preferably made circular in cross section, but the two rings which are located in the outer edges of the sections *c* and *f* are made semi-circular in cross section, the flat side of said rings coming in contact with the flanges *h* and being flush with the sides of said sections.

The use of rings, as described herein, for the purpose of preventing radial distortion of the base of the tire has long been known in this art, and no claim is made herein for such a construction, *per se*. It is not desirable, however, that metal rings having the functions of the rings *m* should have a bearing directly on the tire fabric which is relatively soft and resilient since the compression and expansion of the tire body when in use causes the rings to rapidly wear away the body of the tire.

When the rings are let into the tire body in such manner as to be completely embedded therein, it is impossible to do anything to prevent this cutting action of the ring, but in the structure shown herein in which the rings are located in the plane of the divisional line between the tire sections, it is possible to overcome this objectionable feature as follows: When the tire sections $c$, $d$, $e$, and $f$ are molded, semi-circular oppositely located channels $o$ are molded in the contiguous surfaces of each section and in the outer surface of the two outer sections. These channels all lie in the same plane, transversely of the tire, and are concentric therewith and of larger diameter than the diameter of the rings $m$ to the end that these channels may be lined with a rubber compound which, in the vulcanization process, will become hard and adherent to the wall of the channels $o$, it being of course understood that the compound will be so prepared as not to be brittle when cured but still be sufficiently hard to constitute a good wearing surface interposed between the rings and the tire body and effectually preventing any frictional action between the rings and the tire. If desired, the rings, semi-circular in cross section, which are located in the outer edges of the tire sections $c$ and $f$ and against the flanges, may be secured to said flanges or may be made integral therewith. When the tire-sections are placed together on the rim side by side preparatory to being secured thereto, the total width of the sections will slightly exceed the width of said rim whereby when the flanges $h$ are set up against these sections, by means of the nuts on the bolts $g$, they will be compressed laterally; and, as the material can not, owing to the presence of the rings $m$, bulge outward radially, the part of each section lying below the rings will be forced by lateral compression into a more intimate contact with the rim $b$.

What I claim, is:—

A resilient wheel tire comprising several annular sections located side by side on the rim of a wheel, the contiguous surfaces of which have oppositely-located registering channels therein, a metal ring located in said channels, the latter having a lining of the same material but harder than the tire body and adherent thereto, and means to clamp said sections together transversely.

JOHN CLARENCE COLE.

Witnesses:
H. S. FISK,
A. L. BEERS.